Sept. 13, 1966        J. F. CIRINO ETAL         3,271,803
                    VEHICLE WASHING APPARATUS
Filed Oct. 11, 1965                           2 Sheets-Sheet 1

INVENTORS.
JOHN F. CIRINO
CHARLES BRENNER

INVENTORS.
JOHN F. CIRINO
CHARLES BRENNER 3,271,803
VEHICLE WASHING APPARATUS
John F. Cirino, Churchville, and Charles Brenner, Overbrook Hills, Pa., assignors to Universal Robot Inc., Bala Cynwyd, Pa., a corporation of Pennsylvania
Filed Oct. 11, 1965, Ser. No. 494,452
7 Claims. (Cl. 15—21)

This application is a continuation-in-part of our copending application Serial No. 406,516, filed on October 26, 1964, and entitled: Vehicle Washing Apparatus.

This invention relates to apparatus for automatically washing and drying a stationary vehicle such as an automobile. More particularly, this invention relates to apparatus for automatically washing and drying a stationary vehicle which includes rotatably mounted brushes, and may be used to wash any make of automobile.

The automatic vehicle washing apparatus in our above-identified application is of the type which reciprocates relative to a stationary vehicle for automatically washing and drying the vehicle without manual intervention.

The present invention provides a similar vehicle washing and drying apparatus with means for enabling the brushes to be more effectively utilized. Thus, the present invention provides for a set of rotatable brushes which readily conform to the contours of any make of automobile, and which will not become caught on irregularly shaped parts, such as bumpers.

It is an object of the present invention to disclose a vehicle washing and drying apparatus whose operation may be completely automatic.

It is another object of the present invention to provide an automatic car washing and drying apparatus wherein wash liquid and drying air are discharged from a movable chamber.

It is another object of the present invention to provide an automatic vehicle drying apparatus wherein rotatable brushes are placed in engagement with the body contours of the car.

It is still another object of the present invention to provide an automatic vehicle washing and drying apparatus in which the rotatable brushes will not snag on irregularly shaped parts of the vehicle.

It is still another object of the present invention to provide an automatic vehicle washing and drying apparatus which is more efficient and more effective than those proposed heretofore.

Other objects will appear hereinafter.

For the purpose of illustrating the invention, there is shown in the drawings forms which are presently preferred; it being understood, however, that this invention is not limited to the precise arrangements and instrumentalities shown.

Figure 1:
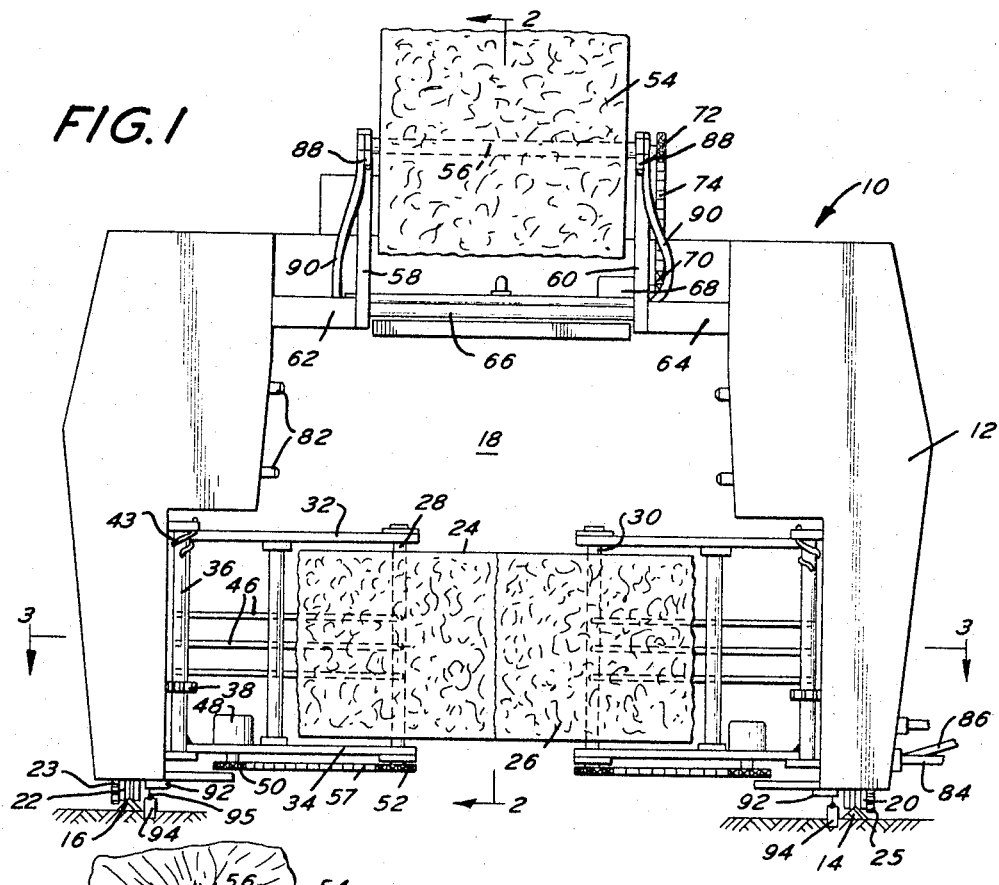
FIGURE 1 is a front elevation view of the car washing apparatus of the present invention in one position of operation.
Figure 2:
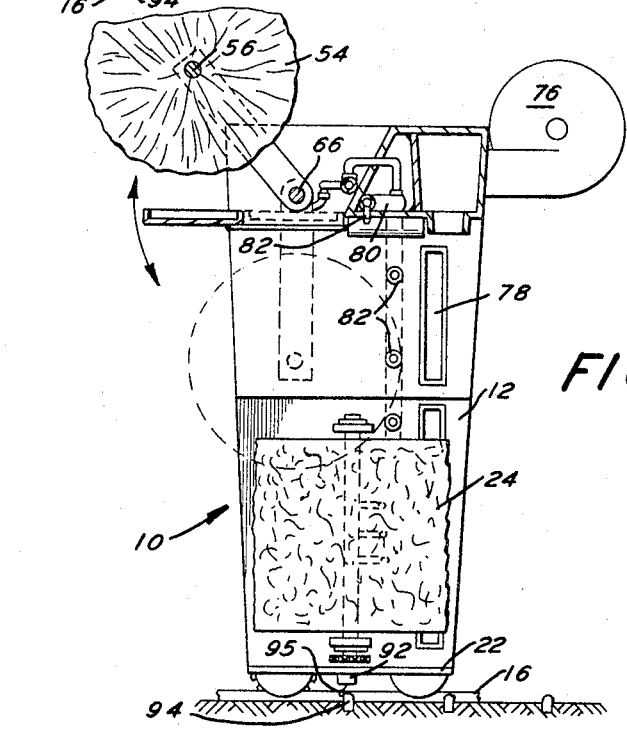
FIGURE 2 is a sectional view taken substantially along the line 2—2 in FIGURE 1.
Figure 4:
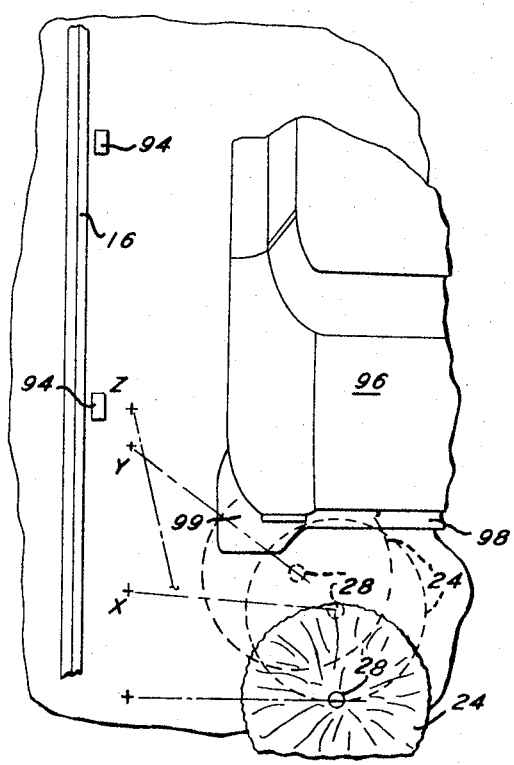
FIGURE 4 is a diagrammatic plan view of the car washing apparatus of the present invention showing the vertical brushes as the apparatus engages a vehicle.

Referring to the drawings in detail, wherein like numerals indicate like elements, there is illustrated in FIGURES 1, 2 and 4 a vehicle washing apparatus designated generally by the numeral 10. The apparatus 10 includes a generally U-shaped hollow frame or housing 12. The housing 12 is adapted to reciprocate along a pair of spaced tracks 14 and 16. The central open area beneath the housing 12 forms a car port 18. A vehicle, such as an automobile, is driven into the car port. The automobile remains stationary and the housing 12 is adapted to reciprocate relative to it.

Figure 3:
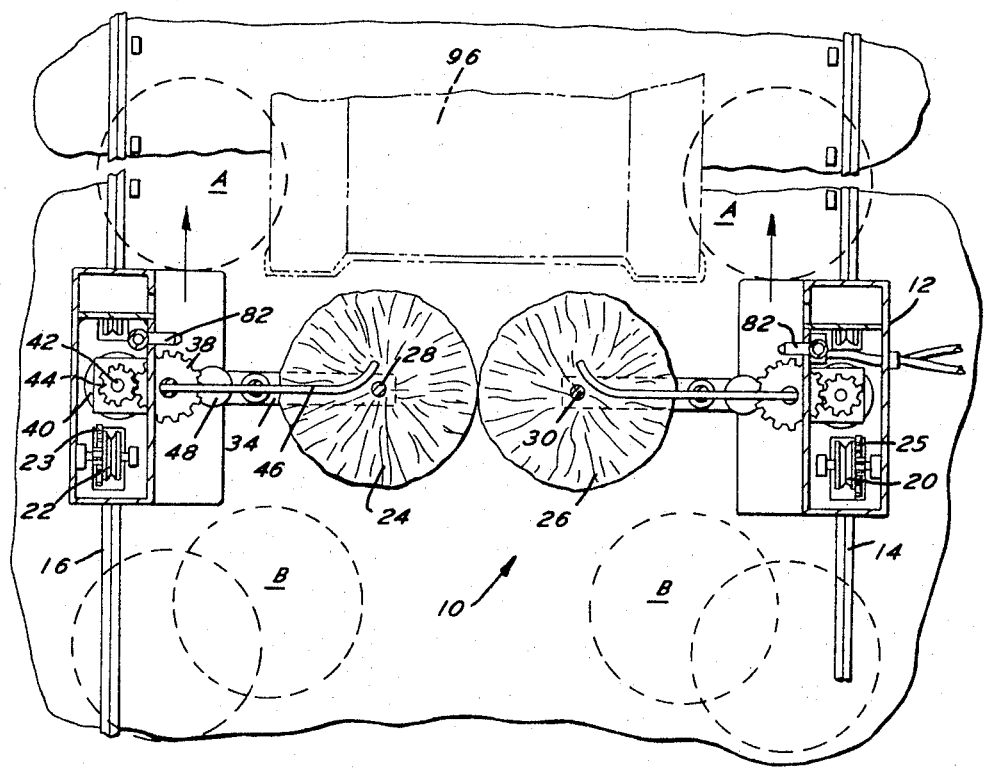
FIGURE 3 is a sectional view taken substantially along the line 3—3 in FIGURE 1.

Pairs of wheels 20 and 22 are supported from the depending legs of the U-shaped hollow housing 12. The wheels 20 and 22 are in rolling engagement with the tracks 14 and 16 respectively. One wheel of each of the pairs of wheels 20 and 22 may be driven in such a manner as will occur to those skilled in the art. For the purpose of illustration, there are shown in FIGURES 1 and 3 sprockets 23 and 25 secured to wheels 22 and 20, respectively. The sprocket 23 and 25 may be coupled to motors, not shown, by means of endless chains.

Extending from the opposed legs of the housing 12 into the car port 18, are a pair of cylindrical brushes 24 and 26. The brush 24 is mounted upon a shaft 28. Similarly, the brush 26 is mounted upon a shaft 30. Each shaft is supported in cantilever fashion at the ends of a pair of parallel arms 32 and 34. The arms 32 and 34 are connected at their ends opposite from their brush shafts to a swivel post 36. The swivel post 36 has a gear 38 fixed intermediate its ends.

A helical spring 43, secured to the swivel post 36, biases the arms 32 and 34 to the position shown in FIGURES 1 and 3.

As is seen in FIGURE 3, an electric motor 40 having a shaft 42 is mounted within each leg of the housing 12. Mounted on the shaft 42 is a pinion 44. The pinion 44 is in driving engagement with the gear 38. Thus, actuation of the electric motor 40 causes rotation of the swivel posts 36 and consequently, swinging of the brushes 24 and 26.

As is seen in FIGURES 1 and 3, fixedly secured to the swivel post 36 are vertically spaced sensing rods 46. The sensing rods 46 have arcuate ends which extend into the brushes 24 and 26 for a purpose which will be more fully explained below.

Mounted on the arm 34 is an electric motor 48. The electric motor 48 drives a sprocket 50. A sprocket 52 is connected to one end of the brush shaft 28. An endless chain 53 is entrained about the sprockets 50 and 52 to effect a driving connection between the motor 48 and the brush shaft 28. Thus, upon actuation of motor 48 the brush 24 is made to rotate around its own axis. The brush 26 is operated in an identical manner. The brushes 24 and 26 are adapted to scrub the sides of an automobile within the car port 18. A third brush 54 is also provided for scrubbing the roof, trunk and hood of the automobile within the car port 18 simultaneously with the scrubbing effected by the brushes 24 and 26. The brush 54 is rotatable about its longitudinal axis. A brush shaft 56 extends through the longitudinal axis of the brush 54 and is connected at opposite ends to spaced, parallel hanger arms 58 and 60. The hanger arms 58 and 60 are connected to hanger arm brackets 62 and 64 respectively. The brackets 62 and 64 are integrally connected to a shaft 66 which extends through them.

Means, not shown, are provided whereby the shaft 66 may be rotated. As seen in FIGURE 2, rotation of the shaft 66 causes the brush 54 to move in an arcuate path from a lowered to a raised position.

Mounted upon hanger arms 60 is an electric motor 68. The motor 68 drives a sprocket 70. Connected to one end of the brush shaft 56 is a sprocket 72. The sprockets 70 and 72 are coupled by an endless chain 74. Actuation of the motor 68 will cause rotation of the brush 54 about its own axis.

The housing 12 includes means whereby soap solution, rinse water and drying air may be directed at a vehicle within the car port 18. As is seen more clearly in FIGURE 2, a blower 76 is secured to the housing 12. The blower 76 is in communication with the hollow legs of the housing 12. Air ducts 78 are formed at spaced areas on the legs of the housing 12. Hence, when the blower 76 is actuated, air is directed from the blower through the ducts 78 about the automobile. The air will cause the automobile to be dried.

As is more fully explained in my copending application, mounted within the housing 12 is a water conduit 80. The water conduit 80 is in communication with spray nozzles 82. The spray nozzles 82 are effective to direct both hot wash water and cold rinse water on the automobile as the housing 12 reciprocates during the washing cycle. As is seen in FIGURE 1, a supply conduit 84 directs hot wash water to the water conduit. A supply conduit 86 is also connected to conduit 80 for supplying cold rinse water. Additional spray nozzles 88 are pivotably secured to hanger arms 58 and 60, and are movable therewith. Flexible conduits 90 conduct water to the spray nozzles 88.

As shown in FIGURES 1 and 2, a row of stops 94 is placed adjacent the tracks 14 and 16. A limit switch 92 is mounted on the bottom portion of the housing. The limit switch 92 has a trip member 95 which is positioned to engage the stops 94 as the apparatus moves along the tracks 14 and 16. The limit switch 92 is electrically connected to the motor 40. Thus, when the trip member 95 is engaged with a stop 94 a circuit is completed to the motor 40. The limit switch 92 may be of the double throw type so that the circuit to the motor is completed when the trip member 95 engages a stop 94 regardless of the direction of motion of the housing 12.

It is believed that the operation of the apparatus, especially in view of the above-mentioned copending application, is apparent from the description heretofore. Thus, coins are adapted to be placed in a meter mounted on one of the sides of the housing 12 or any other convenient supporting surface. The introduction of coins into the meter will actuate suitable electrical circuitry (not shown) for effecting operation of the various components of the apparatus 10 in a predetermined time cycle. Initially, the brushes 24 and 26 are in the position shown in FIGURES 1 and 3. Also, the brush 54 is in the position shown in FIGURES 1 and 2. The car is disposed within the car port 18 with its front bumper in abutment with the brushes 24 and 26.

With the automobile in abutment with the brushes 24 and 26, the washing cycle is initiated. The motors 48 are actuated to cause rotation of the brushes 24 and 26 for scrubbing the front of the automobile. Hot water mixed with a suitable detergent is discharged through the nozzles 82 against the sides of the automobile and across the front. After a predetermined time interval, housing 12 is caused to reciprocate along the tracks 14 and 16. Movement of the housing 12 relative to the automobile will cause the brushes 24 and 26 to be pushed by the front of the automobile and oscillated to the position indicated by A in FIGURE 3. That is, the brushes 24 and 26 are swung about the axis of swivel post 36 to a position trailing the housing. When the brushes 24 and 26 are swung to the position indicated at A in FIGURE 3, a motor, not shown, is actuated to cause the top brush 54 to swing about the axis of the shaft 66 to its operative position illustrated in dotted lines in FIGURE 2. The brush 54 will come down on the front of the hood of the automobile being processed. Since the brushes 24 and 26 have been swung to a position trailing the housing 12, and initially in advance of the sides of the automobile, there is no interference between the brushes 24, 26 and 54. When the brush 54 engages the automobile hood, the motor 68 is actuated to cause rotation of the brush 54 about its longitudinal axis.

Meanwhile, hot water and detergent are also emanating from the nozzles 88 along the sides of the automobile as the housing traverses the automobile. The nozzles 88 are spaced six to eight inches from the hood, thereby causing dirt particles not scrubbed by the brush 54 to break up. Subsequent movement of the housing 12 will cause the brushes 24 and 26 to scrub the sides of the automobile in trailing relation to the top brush 54. The top brush 54 is adapted to swing around the axis of shaft 66 during changes in its elevation, as for example when moving from the hood to the roof of the automobile and from the roof to the trunk.

As the housing 12 traverses the tracks 14 and 16, the trip members 95 of the limit switches 92 engage the spaced stops 94. Engagement of the trip members 95 with the stops 94 closes circuits to the motors 40. It will be understood by those skilled in the art that the circuits to the motors 40 are of a conventional type, typically comprising a pulse switch and time delay relay. Actuation of the motor 40 causes rotation of the shaft 42, the pinion 44, and the gear 38. Swivel post 36, to which the gear 38 is fixedly secured, is rotated therewith. Thus, actuation of the motor 40 results in oscillation of the arms 32 and 34. The motor 40 is arranged to rotate in such a direction that the arms are oscillated in a direction away from the sides of the automobile.

When the trip member 95 of the limit switch 92 passes out of engagement with the stop 94, actuation of the motor 40 ceases, and the helical spring 43 causes the arms 32 and 34 to oscillate so that the brush is once again engaged with the side of the automobile. As will be more fully explained below, momentary oscillation of the arms 32 and 34 by actuation of the motor 40 prevents the brushes 24, 26, or their respective shafts 28 and 30, from becoming snagged on irregular portions of the exterior of the vehicle to be cleaned.

It has been found that snagging is most apt to occur at the rear bumper of the vehicle to be washed. Hence, the stops 94 are located at selected positions along the tracks at or near one end of travel for the housing 12.

When the brush 54 traverses the trunk, the motor, not shown, is reversed so as to raise the brush to the position shown in FIGURES 1 and 2. The trailing brushes 24 and 26 then finish scrubbing the sides of the automobile and when they pass the last side portion, they swing into abutting relationship as shown in FIGURES 1 and 3. The housing 12 is then moved in an opposite direction and the brushes 24 and 26 abut the rear end of the vehicle. The washing cycle continues and the brushes 24 and 26 scrub the rear of the vehicle.

As the housing continues to reciprocate in an opposite direction to the stationary vehicle, the brushes 24 and 26 are caused to oscillate by contact with the rear of the vehicle to the position shown by B in FIGURE 3. The brushes 24 and 26 once again lag behind the housing 12. As the brushes 24 and 26 assume the position B, the top brush 54 is lowered into contact with the trunk of the vehicle. The washing cycle then continues as described before.

Turning now to FIGURE 4, it is seen how the novel features of this invention prevent the brushes 24 and 26 and their shafts 28 and 30 from becoming snagged on irregular portions 99 of the vehicle. The automobile 96 has an irregularly shaped bumper 98 as is the case with numerous types of automobiles of recent manufacture. In the situation depicted in FIGURE 4, the housing 12 has completed its initial washing cycle, and has passed from the front to the rear of the vehicle. The brush 24, as shown in solid lines, is in abutting relationship with the brush 26. The arms 32 and 34, shown diagrammatically by a broken line, are initially perpendicular to the track 16 and hence to the path of travel of the housing 12. As the housing continues to reciprocate, the brush 24 comes into initial contact with the rear of the vehicle. Thus, when the housing has advanced to the position designated X in FIGURE 4, the brush 24 is in contact with the rear of the automobile 96, and the arms 32 and 34 have begun to oscillate.

When the housing 12 has reached the position designated Y in FIGURE 4, the arms 32 and 34 have rotated through an angle of approximately 40 degrees. Note, however, that due to compression of the bristles of the brush 24, when the housing 12 reaches the position Y the shaft 28 on which the brush 24 is mounted is in danger of becoming snagged on a protruding portion 99 of the bumper 98. Should this occur, serious damage is apt to occur to the apparatus 10. As the housing continues to the position indicated by the Z, the trip member 95 of the limit switch 92 engages the stop 94. As explained above, engagement of the trip member 95 with the stop 94 closes the limit switch 92 and actuates the motor 40. Thus, before the shaft 28 comes into actual engagement with the bumper 98, the motor 40 is actuated to move the arms 32 and 34 in a clockwise direction as seen in FIGURE 4. Hence, no snagging will occur. When the housing has passed the stop 94 the arms 32 and 34, under the urging of the helical spring 43, return to contact the sides of the vehicle.

It is apparent that the motor 40 will be actuated briefly as the trip member 95 contacts each successive stop during the reciprocal movement of the housing 12.

It will be appreciated that the undersirable situation depicted in FIGURE 4 will occur only if the producing part of the vehicle fails to contact the sensing rods 46. Thus, contact of a part of the vehicle with the sensing rods 46 is effective to oscillate the arms 32 and 34, thereby avoiding snagging. As is more clearly shown in FIGURE 3, the sensing rods 46 extend into the brushes 24 and 26 and have their ends adjacent the respective shafts 28 and 30. Also, the ends of the sensing rods 46 are of an arcuate shape.

It has been found that snagging most frequently occurs on the rear bumper of the vehicle to be washed. As shown in FIGURE 3, the arcuate ends of the sensing rods 46 are bent so that they point inwardly toward the rear of the automobile as the housing 12 begins its return stroke. This arrangement has been found most effective in furthering the object of this invention. As the housing 12 advances toward the rear of a vehicle, any protruding part first engages the main portions of the sensing rods 46. Further advancement of the housing 12 draws the arcuate portions over the protrusion. Thus, in the normal case, the protruding portion 99 cannot contact the shaft 28 and 30.

The present invention may be embodied in other specific forms without departing from the spirit or essential attributes thereof, and accordingly, reference should be made to the appended claims, rather than to the foregoing specifications as indicating the scope of the invention.

We claim:

1. Apparatus for washing a vehicle comprising a reciprocatory substantially U-shaped housing, a pair of arms mounted on each of the legs of said U-shaped housing for oscillation about a vertical axis, a rotatable brush mounted on each of said pairs of arms for rotation about a vertical axis and adapted to be in wiping engagement with the sides of a vehicle, biasing means for biasing said arms so that said brushes are in engagement with the sides of said vehicle, motor means for oscillating said arms, a plurality of stops disposed in a line parallel to the path of movement of said U-shaped housing, limit switches on said housing and adapted to engage said stops, said limit switches being operatively connected with said motor means so that engagement of said limit switches with said stops causes said arms to oscillate and thereby move said brushes out of engagement with the sides of said vehicle.

2. Apparatus for washing a vehicle comprising a reciprocatory substantially U-shaped housing, a pair of arms mounted on each of the legs of said U-shaped housing for oscillation about a vertical axis, a rotatable brush mounted on each of said pairs of arms for rotation about a vertical axis and adapted to be in wiping engagement with the sides of a vehicle, biasing means for biasing said arms so that said brushes are in engagement with the sides of said vehicle, sensing rod means coupled to said arms for movement therewith, said sensing rod means being disposed generally parallel to said arms, and terminating adjacent said second-mentioned axis, motor means for oscillating said arms, a plurality of stops disposed in a line parallel to the path of movement of said U-shaped housing, limit switches on said housing and adapted to engage said stops, said limit switches being operatively connected with said motor means so that engagement of said limit switches with said stops causes said arms to oscillate and thereby move said brushes out of engagement with the sides of said vehicle.

3. Apparatus for washing a vehicle comprising a reciprocally mounted housing, at least one pair of arms mounted on said housing for oscillation about a vertical axis, a rotatable brush mounted on said arms for rotation about a vertical axis and adapted to be in wiping engagement with the side of a vehicle, drive means for said brush, biasing means for biasing said arms so that said brush is in engagement with the side of a vehicle, sensing rod means coupled to said arms for movement therewith, said sensing rod means being disposed generally parallel to said arms and terminating adjacent said second-mentioned axis, motor means for oscillating said arms, a plurality of stops disposed in a line parallel to the path of movement of said housing, limit switch means on said housing and adapted to engage said stops, said limit switch means being operatively connected with said motor means so that engagement of said limit switch means with said stops causes said arms to oscillate and thereby move said brush out of engagement with the side of said vehicle.

4. Apparatus for washing a vehicle comprising a reciprocally mounted housing, at least one pair of arms mounted on said housing for oscillation about a vertical axis, a rotatable brush mounted on said arms for rotation about a vertical axis and adapted to be in wiping engagement with the side of a vehicle, drive means for said brush, biasing means for biasing said arms so that said brush is in engagement with the side of a vehicle, motor means for oscillating said arms, a plurality of stops disposed in a line parallel to the path of movement of said housing, limit switch means on said housing and adapted to engage said stops, said limit switch means being operatively connected with said motor means so that engagement of said limit switch means with said stops causes said arms to oscillate and thereby move said brush out of engagement with the side of said vehicle.

5. Apparatus for washing a vehicle comprising a reciprocally mounted housing, a pair of arms mounted on said housing for oscillation about a vertical axis, a rotatable brush mounted on said arms for rotation about a vertical axis and adapted to be in wiping engagement with a side of the vehicle, drive means for said brush, biasing means for biasing said arms so that said brush is in engagement with the side of a vehicle, sensing rod means coupled to said arms for movement therewith, said sensing rod means comprising a plurality of vertically spaced rods, said rods being disposed generally parallel to said arms, said rods extending into said brush and terminating adjacent said second-mentioned axis.

6. Apparatus in accordance with claim 5 wherein each of said vertically spaced rods has a horizontally disposed arcuate end portion adjacent said second-mentioned axis.

7. Apparatus for washing a vehicle comprising a reciprocatory substantially U-shaped housing, a pair of arms mounted on each of the legs of said U-shaped housing for oscillation about a vertical axis, a rotatable brush mounted on each of said pairs of arms for rotation about a vertical axis, means biasing said pairs of arms toward each other so that said rotatable brushes are in engagement with a vehicle, motor means for oscillating said arms to a position wherein said brushes are out of engagement with the vehicle, and position responsive means carried by said housing for actuating said motor means.

References Cited by the Examiner

UNITED STATES PATENTS

| | | | |
|---|---|---|---|
| 3,035,293 | 5/1962 | Larson | 15—21 |
| 3,187,359 | 6/1965 | Takeuchi | 15—21 |

CHARLES A. WILLMUTH, *Primary Examiner.*

EDWARD L. ROBERTS, *Assistant Examiner.*